United States Patent [19]

Borras et al.

[11] Patent Number: 5,060,295
[45] Date of Patent: Oct. 22, 1991

[54] RADIO DEVICE WITH CONTROLLED PORT AND METHOD OF PORT CONTROL

[75] Inventors: Jaime A. Borras, Hialeah; Wayne H. Browand, Sunrise, both of Fla.

[73] Assignee: Motorola, Inc., Schaumburg, Ill.

[21] Appl. No.: 129,882

[22] Filed: Nov. 25, 1987

Related U.S. Application Data

[63] Continuation of Ser. No. 798,643, Nov. 15, 1985, abandoned.

[51] Int. Cl.$^5$ .............................................. H04B 1/10
[52] U.S. Cl. ...................................... 455/186; 455/68
[58] Field of Search ................... 455/151, 185, 186, 4, 455/226, 68; 358/86; 340/825.31, 825.5; 380/20

[56] References Cited

U.S. PATENT DOCUMENTS

| | | |
|---|---|---|
| 3,769,593 | 10/1973 | Williams . |
| 4,010,461 | 3/1977 | Stodolski . |
| 4,422,071 | 12/1983 | de Graaf . |
| 4,460,922 | 7/1984 | Ensinger et al. ...................... 380/20 |
| 4,461,032 | 7/1984 | Skerlos .................................. 358/86 |
| 4,471,352 | 9/1984 | Soulliard et al. . |
| 4,486,883 | 12/1984 | Kanai et al. . |
| 4,525,865 | 6/1985 | Mears .................................. 455/186 |
| 4,529,980 | 7/1985 | Liotine et al. ....................... 455/151 |
| 4,593,155 | 6/1986 | Hawkins ........................... 340/825.5 |
| 4,653,514 | 12/1986 | Fimoff et al. ...................... 455/151 |
| 4,677,467 | 6/1987 | Hayes ................................. 455/131 |

*Primary Examiner*—Curtis Kuntz
*Attorney, Agent, or Firm*—Juliana Agon; Dan Nichols

[57] ABSTRACT

This radio includes a port for communication with the radio and can be used for programming its memory in order to set the radio personality. A gate is provided for selectively enabling and disabling communication through the port. The gate is controlled by signals transmitted to the radio. A memory retains the last transmitted control signal.

10 Claims, 5 Drawing Sheets

RADIO DEVICE WITH CONTROLLED PORT AND METHOD OF PORT CONTROL

This is a continuation of application Ser. No. 798,643, filed Nov. 15, 1985, now abandoned.

BACKGROUND OF THE INVENTION

This invention relates generally to electronic devices having programmable memories and particularly to electronic devices such as radios that have programming ports for programming the memories.

Technological advances in the electronic area, particularly in the area of digital devices including microprocessors and solid state memory devices such as Programmable Read Only Memories (PROM'S) and Electrical Erasable Programmable Read Only Memories (EEPROM'S), have lead to significant changes in the design of electronic devices such as two-way radios.

Early generation radios utilized crystals for channel elements with individual crystals for each desired frequency. Such crystals were slaved to a channel selector switch along with additional features such as subaudible tone encoders and decoders. Other personality features of the radio were either hard wired discrete type circuitry or modules that were installed in order to provide the desired personality feature of a particular radio.

The development of frequency synthesizers provided a major advance in radio design by eliminating the requirement of individual channel elements for each desired frequency of operation. By utilizing a memory to maintain the necessary divisor information for use with the frequency synthesizer, any desired frequency within the operating range of the radio can be achieved simply by changing the divisor information in the memory. Such memory devices can also be used to store designators of appropriate subaudible tone information for the individual channel as well as other information.

The use of microprocessors in radios has greatly enhanced the flexibility of the radio design. While many desired functions such as scanning, can be achieved without the use of microprocessors, the microprocessor simplifies the radio design by allowing the manufacturer to build a single design and program the individual radios to have any or all of the possible available functions.

PROM's have been widely used as code plugs for containing channel information. The use of PROM's allows radios to be easily customized, that is, the particular desired channels of operation can be programmed into a PROM which is then inserted into a radio. A significant drawback to the use of PROM's is that, if it is desired to redefine the frequency information for the channels of operation, it is necessary to replace the PROM with a different PROM containing the desired information. Advances in the EEPROM art have removed this limitation.

Since EEPROM's are electrically erasable, they can be erased and reprogrammed while in place in the radio. This development has permitted radios to be built with a great degree of flexibility, in that the characteristics of each individual radio can be reprogrammed with relative ease.

In order to provide for programming of such radios, a connector or port is provided on the radio for programming purposes. Such a port, by allowing ready access for programming, is useful to both the manufacturer and the user of the radio. The ease of programming does however present a problem, in that it is difficult to prevent unauthorized reprogramming of the device. For example, metropolitan police departments are sensitive to the theft of their radios. It is a particular concern to them that a stolen radio can be easily reprogrammed to operate on any other of their frequencies. Consequently, it is desirable to provide means for preventing the unauthorized reprogramming of such radios.

SUMMARY OF THE INVENTION

This electronic device, which includes a memory and a programming port, provides means for disabling the programming port for preventing reprogramming of the device. The device uses a coded signal, such as an RF signal transmitted to the device, for selectively enabling or disabling communication through the port.

In one aspect of the invention, a portable radio device includes a receiver means for receiving an RF signal, a programmable memory means for storing customized radio information, and connector means for providing an external connection for programming the memory means. A gate means operatively interconnects the connector means and the memory means. The control means is responsive to received RF signals for selectively actuating the gate means off for inhibiting programming of the memory means and selectively actuating the gate means on for permitting programming of the memory means through the connector means. In another aspect of the invention, the memory is an EEPROM. The programmable memory means includes a control memory location.

In still another aspect of the invention, the control means includes a flip-flop having an input operatively connecting to the control memory location and having an output operatively connected to the gate means for controlling the gate means. In yet another aspect of the invention, the flip-flip is a type D flip-flop. The gate and flip-flop are included on a single integrated circuit.

In one aspect of the invention, a microprocessor is operatively connected between the gate means and memory means. A communication bus is connected to the microprocessor. A gate means operatively connects the connector to the bus for communication with the microprocessor and memory means.

In another embodiment of the invention, an electronic device comprises a communication port and a communication bus. A gate means is operatively connected between the port and the bus. Control means are connected to the gate means for controlling the gate means. An RF receiving means is operatively connected to the control means for actuating the control means in response to received RF signals for selectively allowing or inhibiting communication with the bus through the port.

In yet another aspect of the invention, a method of controlling access of a communication port to an electronic device is provided. The method includes the steps of programming the device to accept predetermined signals indicative of the desired port control, transmitting predetermined signals indicative of the desired port control to the device, receiving the transmitted signal, setting a memory in response to the received signal, and actuating a data gate connected to the port in response to the setting of the memory to selectively permit or inhibit communication through the port to the device. In another aspect of the invention, the transmitted signal is an RF signal which is received prior to resetting the memory.

BRIEF DESCRIPTION OF THE INVENTION

DESCRIPTION OF THE PREFERRED EMBODIMENT

Figure 1:
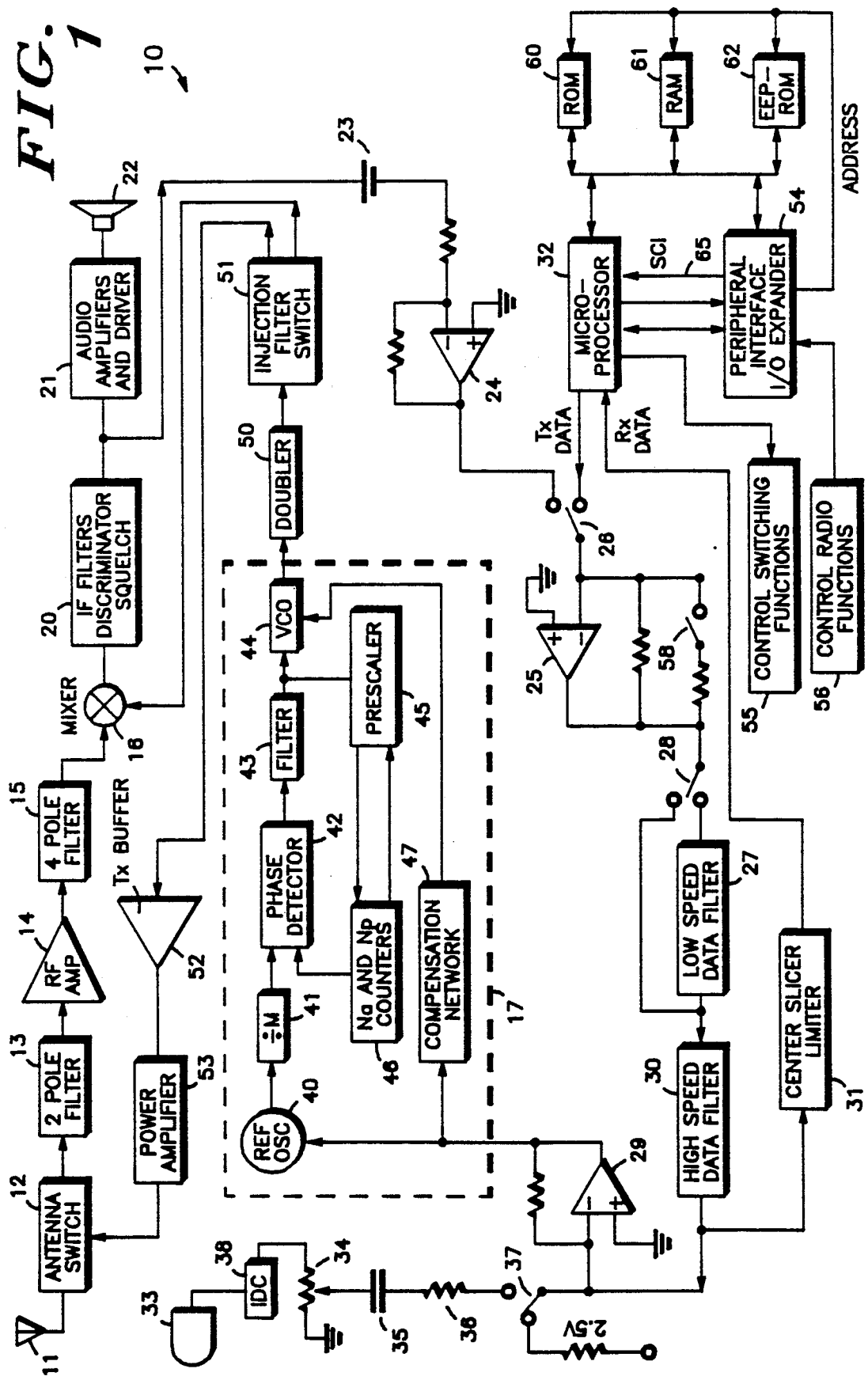
FIG. 1 is a block diagram of a radio incorporating the invention.

Referring now by characters of reference to the drawings and first to FIG. 1 a block diagram of a two way portable radio, generally indicated by 10, is shown. Radio 10 is an FM transceiver, capable of both voice and digital data communications, utilizing a single conversion, superheterodyne receiver.

An antenna 11 is switchable by an antenna switch 12 for transmit and receive purposes. During reception, the switch 12 couples the antenna 11 to a two-pole filter 13, and RF amplifier 14, and a four-pole filter 15 which is coupled to a mixer 16. A local oscillator input to the mixer 16 comes from a synthesizer, generally indicated by 17. The output of the mixer 16 goes to the IF filters, discriminator, and squelch stages, indicated by 20. Audio signals are then amplified by amplifiers and driver 21, and the output is connected to the speaker 22.

Received digital signals are coupled by a coupling capacitor 23 to an amplifier stage 24, to a second amplifier 25 via switch 26, and then selectively either to a low speed data filter 27 or directly to the high speed data filter 30 by switch 28. The filtered data is passed through a center slicer/limiter 31 and data decoding is accomplished utilizing a microprocessor 32.

The synthesizer 17 is utilized for both transmitting and receiving. It is modulated during transmission by data and/or voice signals. Data signals are generated by the microprocessor 32 and passed through the amplifier 25, through the appropriate high or low speed data filters 27 and 30, through an additional amplifier stage 29, and to the synthesizer 17.

Where voice transmission is desired, a microphone 33 is coupled through an instantaneous deviation control (IDC) 38 through the level setting voltage divider 34 and coupled to the amplifier 29 by capacitor 35 and resistor 36 through switch 37. The voice and/or data is then applied to synthesizer 17 to modulate a reference oscillator 40, the output of which goes through a programmable divide by "M" divider 41, through a phase detector 42, filter 43, and a voltage control oscillator 44. In order to provide a wide band modulation response for the transmission, the output from the amplifier 29 is also applied to a compensation network 47 and to the VCO 44.

To provide for phase lock of the synthesizer 17, the output of the filter 43 is passed through a prescaler 45, $N_A$ and $N_P$ counters 46 and to phase detector 42.

The output of VCO 44 is applied through a frequency doubler 50 to the injection filter switch 51 which routes the output either to the mixer 16 for receive purposes or to transmit buffer 52, power amplifier 53, and through the antenna switch 12 to the antenna 11.

It will be appreciated that various switching and control functions are accomplished by the microprocessor 32 through the control switching functions 55, and the peripheral interface and I/O expander 54 which is connected to the control radio functions 56. While the control lines are not shown in FIG. 1, it will be understood that the switching functions 55 controls various switching functions. Switches connected to the control switching functions 55 include switch 28 that selects either the high or the low speed data filters 27 and 30. Switch 58 which is associated with amplifier 25 and controls the gain of this amplifier stage in order that a uniform signal level can be presented regardless of whether the data is high or low speed data.

Switch 26, which is used to connect the received data to the filter stages or the data generated by the microprocessor to the filter stages, is also controlled by the switching functions 55. The control switching functions 55 also control the audio switch 37 and the time constant at the center slicer/limiter 31, corresponding to the reception of low or high speed data. Various connections of the peripheral interface I/O expander 54 are shown in FIG. 2.

Connected to the microprocessor 32 are several memory devices: a ROM 60 which contains program information for the microprocessor 32, a RAM 61 for use by the microprocessor, and a EEPROM 62 which functions as the code plug for the radio 10 and contains the specific, customized radio information such as: frequency channels, subaudible and digital subaudible tone information for trunked radio systems, subfleet, private call, and call alert information, any other desired controls, and other microprocessor controlled function information.

Figure 2:
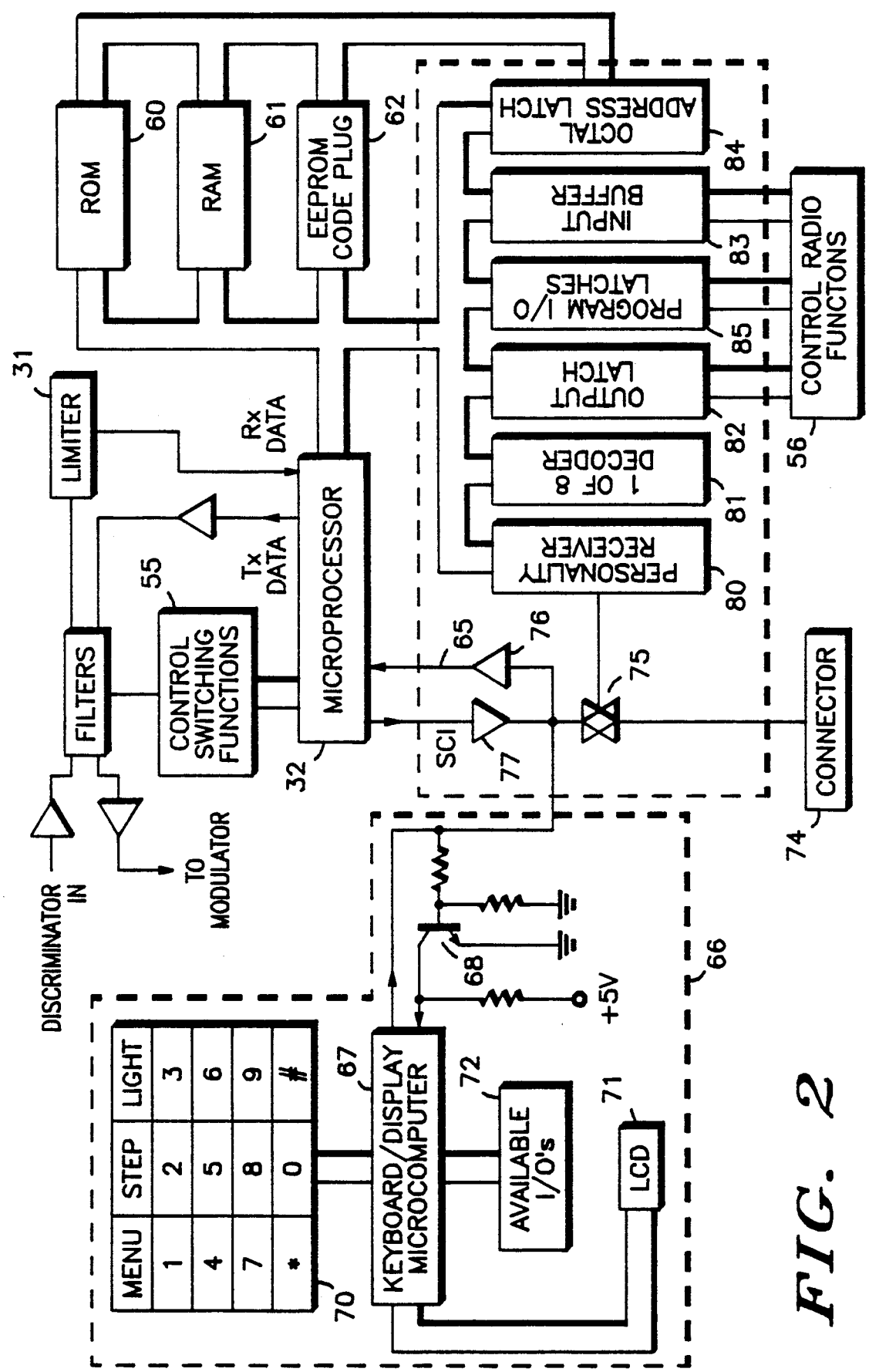
FIG. 2 is a block diagram of the logic portion of the radio.

Referring now to FIG. 2, an SCI (Serial Communication Interface) bus 65 is connected to the microprocessor 32 for providing data, such as control instructions, to the microprocessor. A radio keyboard/display assembly shown generally as 66, includes a keyboard/display microcomputer 67 connected to the bus 65 through level control circuitry 68. This microcomputer serves to interface between a keypad 70, used to entering control instructions, and an LCD display 71, which can show various radio information such as mode of operation. The keyboard/display microcomputer 67 has additional available I/O's, shown as a separate block designated as 72, for other keyboard/display functions, such as providing and controlling the lighting for the LCD display 71.

A connector 74, constituting connector means, provides a communication port on the radio 10 in order to allow connection of external communication and/or programming equipment to the radio. Communication with the connector is provided through a gate 75, constituting gate means, to the SCI bus 65.

The SCI bus 65 includes buffer circuits 76 and 77 in the peripheral interface and I/O expander 54. Also included in the peripheral interface and I/O expander 54 is a radio personality register 80, which along with its input, provides control means for controlling the gate 75. A one-of-eight decoder 81 is provided to individually select to read or write to the input or output ports within the peripheral interface and I/O expander 54. One of the decoder 81 outputs is used to clock the personality register 80 when the R/W signal is low for loading the register. Output latches 82, data input buffer 83, and programmable input and output latch 85 are provided for interfacing with the control radio functions 56. An octal address latch 84 is utilized for storing the low order byte of the address for memories 60-62. TX data and RX data both connected from and to the microprocessor 32 is shown connected to portions of the receiver and transmitter circuits in block form in this Figure. In the preferred embodiment, control gate 75 and radio personality register 80 are provided on a single integrated circuit.

Figure 3:
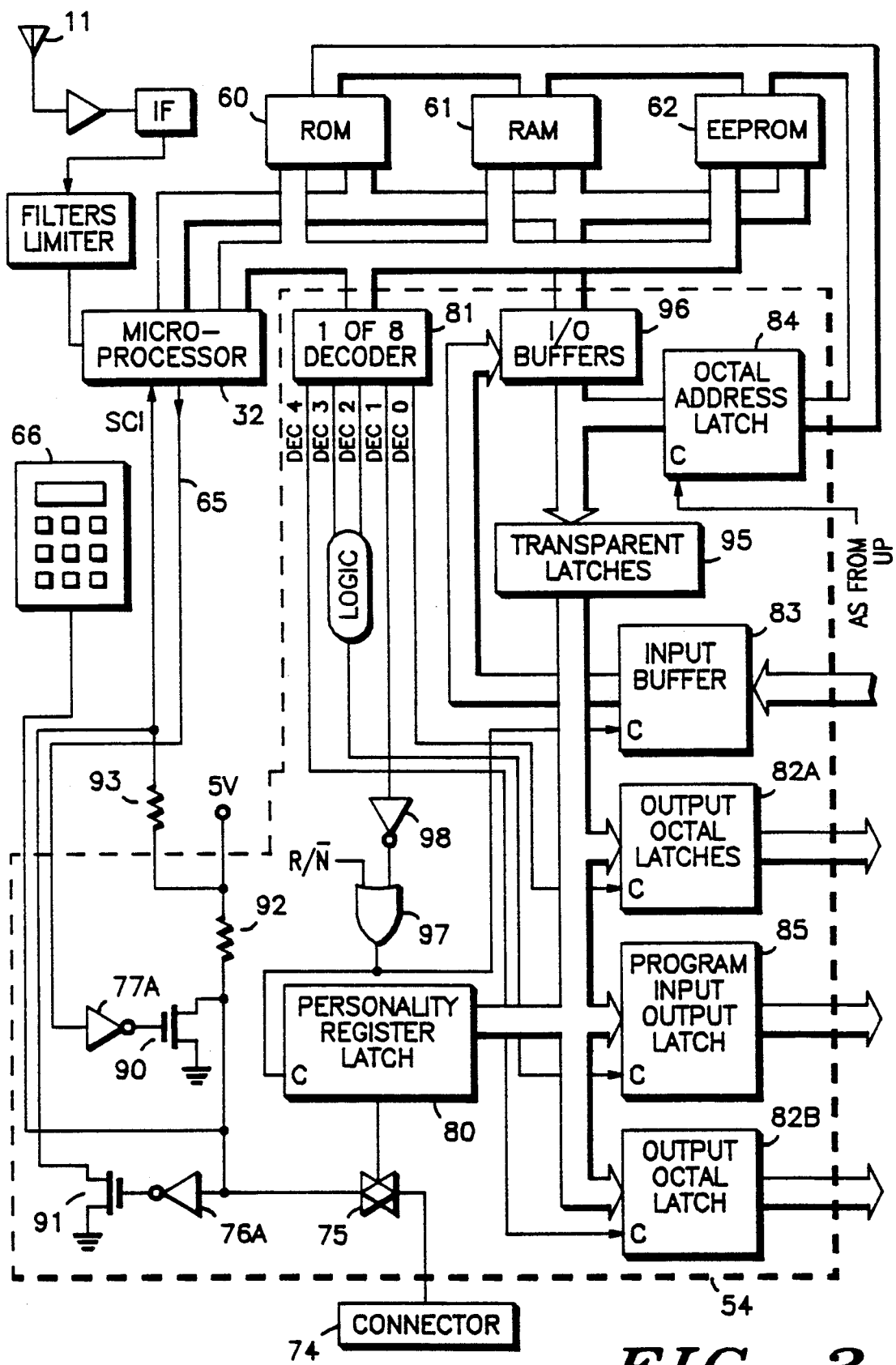
FIG. 3 is a block diagram of the logic portion of the radio showing the gate and bus structure.

Referring now to FIG. 3, the SCI bus 65 is connected to the control gate 75 and the keypad/display assembly 66, through inverter 77A and N channel MOSFET device 90 which form buffer circuit 77 and the inverter 76A and N Channel MOSFET device 91 make up buffer circuit 76 which provides the communication path back to the microprocessor 32.

The open drain N channel MOSFET devices 90 and 91 are connected to resistors 92 and 93 respectively, for providing the necessary voltage level transitions.

The radio personality register 80 comprises a type D flip-flop having the data input responsive to information stored in EEPROM memory 62 through transparent latches 95 which are provided to assure proper signalling timing together with I/0 buffers 96. The clock input of flip-flop 80 is provided through OR gate 97 which has one input connected to DEC 1 of one-of-eight decoder 81 through inverter 98 and the other input connected to the READ/WRITE line of microprocessor 32.

The radio personality information is stored in the EEPROM 62 and during initial powering up of the radio an initialization routine is run which causes the radio personality information to be loaded into the personality register 80. The type D flip-flop of register 80 which controls the gate 75 is set based upon the preprogrammed status information. Various other outputs of the one-of-eight decoder 81 are used for enabling the octal latches 82A, 82B, 83 as well as the programmable input/output latch 85. Clocking of the octal address latch 84 is provided by an address strobe output of microprocessor 32.

Figure 4:
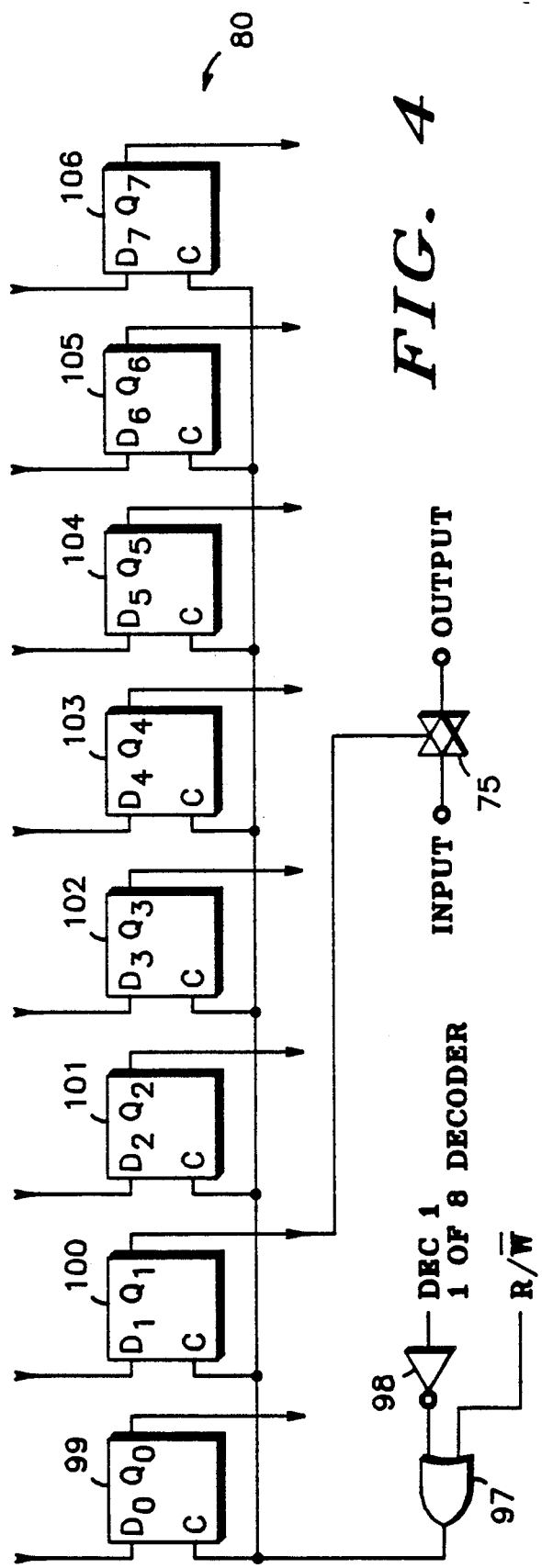
FIG. 4 is a block diagram of the radio personality register.

FIG. 4 shows the radio personality register 80 in greater detail. As illustrated, the personality register 80 includes eight type D flip-flops. The individual flip-flop 100 is in the flip-flop that controls gate 75. Once the flip-flop 100 has been set, the status of communication with the connector 74 is determined until the flip-flop 100 is reset.

The other D flip-flops of register 80 can be used for various other personality information. For example, in the applicants preferred embodiment, flip-flop 99 is set to configure the programmable input/output latches 85 appropriately for a mobile or a portable radio application. Flip-flop 101 is set to provide a different timing sequence for the particular EEPROM 62 installed in the radio. Flip-flops 102 and 103 are used for testing the integrated circuit on which the register 80 resides after manufacture. Flip-flops 104 through 106 are not utilized.

Figure 5:
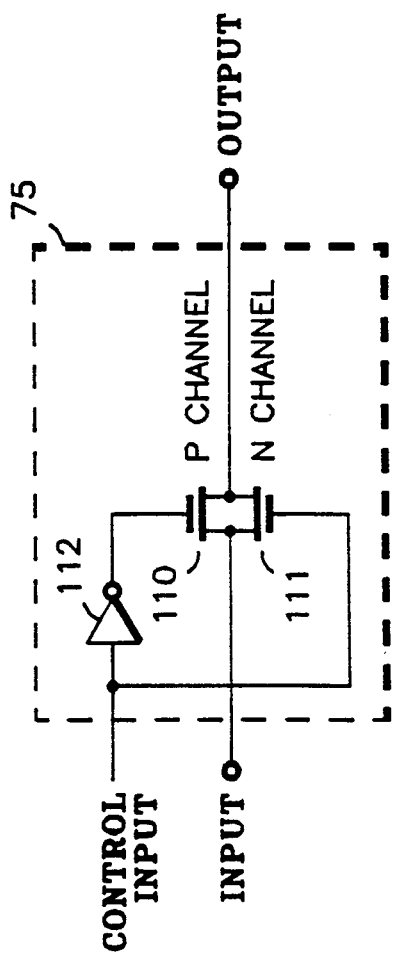
FIG. 5 is an electrical schematic diagram of the gate.

Referring now to FIG. 5, the particular structure of the gate 75 is disclosed. The gate 75 includes a P-channel MOS FET 110 and an N-channel MOS FET 111 connected in parallel. The control input is connected directly to the gate of transistor 111 and through an inverter 112 to the gate of transistor 110. The transistors 110 and 111 are opposite type and by using the inverter 112 it will be understood that based on the control signal to the gate 75 both of the transistors 110 and 111 will be either off or on.

Figure 6:
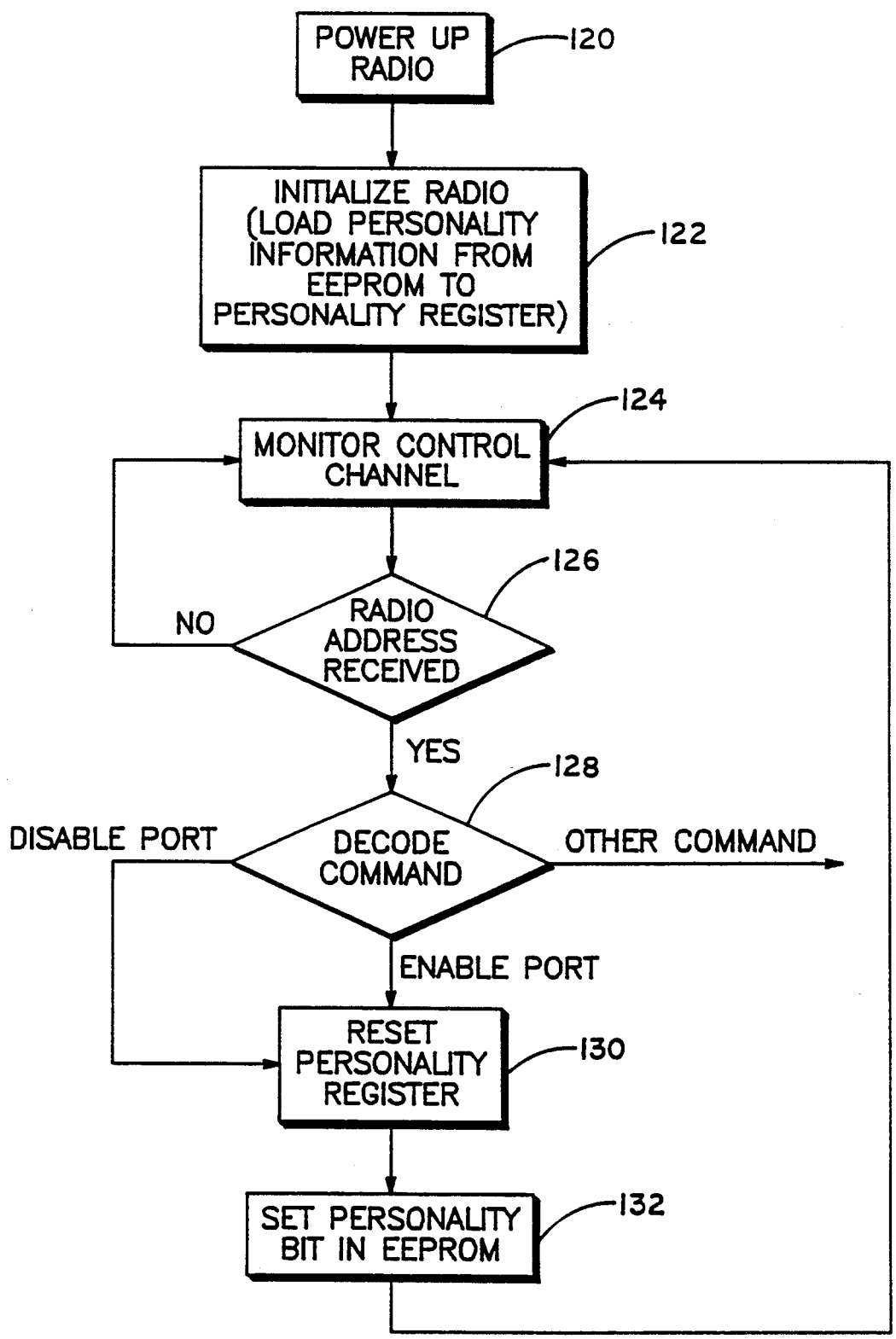
FIG. 6 is a flow chart of the personality register control.

Referring now to FIG. 6, a flow chart of the personality register control is illustrated. The Power Up Radio block 120 has its output connected to the Initialization Radio block 122 where the personality information from the EEPROM is loaded into the personality register. Block 122 has its output connected to Monitor Control Channel block 124, which, in turn, is connected to Radio Address Received decision block 126. The NO output of block 126 is connected back to the Monitor Control Channel block 124, while the YES output is connected to a Decode Command decision block 128. Disable Port and Enable Port outputs of block 128 are connected to a Reset Personality Register block 130. An Other Command output of block 128 is also provided with its connection not being shown. The output of Reset Personality Register block 130 goes to a Set Personality Bit In EEPROM, block 132, which in turn branches back to the Monitor Control Channel block 124.

It is thought that the structural features and functional advantages of the radio device with a control port have become fully apparent from the foregoing description of parts, but for completeness of disclosure the operation of the device will be briefly discussed.

It will be understood that while the gate means is shown as a single gate 75, since a single communication line is used in the preferred embodiment that the gate means can include additional such gates where more than a single line is being controlled.

In operation, a single bit of information stored in a personality byte of information in the EEPROM 62 is used to determine the status of the gate 75. As indicated in FIG. 6, this bit of information is loaded with its associated byte into the personality register 80 when the radio is initialized when it is powered up. The type D flip-flop 100 retains this bit of information and its output is connected to the input of gate 75 for controlling communications through gate 75. When the bit is set to inhibit communications to the gate 75, any communication including reprogramming of the radio through the connector 74 cannot be accomplished.

In order to reset the personality information in the EEPROM 62, an RF signal must be transmitted to the device including particular address information that is recognized by the radio 10 as well as an appropriate command instruction to the microprocessor 32. The microprocessor then clocks the appropriate byte of information into the personality register 80 and the new output state of flip-flop 100 is supplied to the gate 75 to selectively bias transistors 110 and 111 into either on or off state. The microprocessor also reprograms the EEPROM with the new bit corresponding to the desired gate status.

For programming purposes, with gate 75 on digital signals can be communicated to microprocessor 32 to instruct the microprocessor to reprogram its code plug, EEPROM 62, with new information such as channel or feature control information.

We claim as our invention:

1. A radio device comprising:
   receiver means having an antenna for receiving a radio signal including digital information,
   programmable memory means for storing customized radio information,
   connector means for providing an external data connection to the radio device memory means, gate means operatively interconnecting the connector means and the memory means, and control means, responsive to the received radio signal for selectively actuating the gate means off to inhibit communication with the memory means and selectively actuating the gate means on for permitting communication with the memory means via the connector means, the programmable memory means including a bit of information for control of said gate means.

2. The radio device of claim 1, wherein the programmable memory means comprises an electrically erasable read only memory.

3. The radio device of claim 1 wherein, a microprocessor is operatively connected between the gate means and the memory means.

4. The radio device of claim 3 wherein, a communication bus is connected to the microprocessor, and the gate means operatively connects the connector means to the bus for communication with the microprocessor and memory means.

5. A radio device comprising:

receiver means having an antenna for receiving a radio signal including digital information, programmable memory means for storing customized radio information, connector means for providing an external data connection to the radio device memory means, gate means operatively interconnecting the connector means and the memory means, and control means, responsive to the received radio signal for selectively actuating the gate means off to inhibit communication with the memory means and selectively actuating the gate means on for permitting communication with the memory means via the connector means, the programmable memory means including a bit of information for control of said gate means, and the control means including a flip-flop having an input operatively connected to the programmable memory means for loading and retaining said bit of information and having an output connected to the gate means for controlling the gate means.

6. A radio device comprising:

receiver means having an antenna for receiving a radio signal including digital information, programmable memory means for storing customized radio information, connector means for providing an external data connection to the radio device memory means, gate means operatively interconnecting the connector means and the memory means, and control means, responsive to the received radio signal for selectively actuating the gate means off to inhibit communication with the memory means and selectively actuating the gate means on for permitting communication with the memory means via the connector means, the programmable memory means including a bit of information for control of said gate means, and the control means including a "D" flip-flop having an input operatively connected to the programmable memory means for loading and retaining said bit of information and having an output connected to the gate means for controlling the gate means.

7. A radio device comprising:

receiver means having an antenna for receiving a radio signal including digital information, programmable memory means for storing customized radio information, connector means for providing an external data connection to the radio device memory means, gate means operatively interconnecting the connector means and the memory means, and control means, responsive to the received radio signal for selectively actuating the gate means off to inhibit communication with the memory means and selectively actuating the gate means on for permitting communication with the memory means via the connector means, the programmable memory means including a bit of information for control of said gate means, the control means including a "D" flip-flop having an input operatively connected to the programmable memory means for loading and retaining said bit of information and having an output connected to the gate means for controlling the gate means, and the gate means and flip-flop are included on a single integrated circuit.

8. A portable radio device comprising:

receiver for receiving a radio signal, an EEPROM for storing customized radio information, a connector for providing an external connection to the portable radio device for communication with the EEPROM, a gate operatively interconnecting the connector and the EEPROM, and a control means, responsive to the received RF signal for selectively actuating the gate off to inhibit communication with the EEPROM and selectively actuating the gate on to permit communication with the EEPROM via the connector, and the EEPROM including a bit of information for control of said gate.

9. The portable radio device of claim 8, wherein a microprocessor operatively connects the connector to the EEPROM and, a communication bus operatively connects the connector to the microprocessor with the gate connecting the bus and the connector.

10. A radio device comprising:

a data communication port providing an external connection to the radio device, a data communication bus, a gate means operatively connecting the data port to the bus, a control means operatively connected to the gate means for controlling the gate means, and a radio receiver including an antenna operatively connected to the control means for receiving a coded signal transmitted by radio and actuating the control means in response to the received coded signal for alternatively allowing or inhibiting communication with the bus through said port, said bus providing a bit of information for control of said gate means.

* * * * *